United States Patent
Guha et al.

(10) Patent No.: US 11,458,651 B2
(45) Date of Patent: Oct. 4, 2022

(54) PRE-CONSOLIDATION OF THERMOPLASTIC FIBER PREFORMS AND METHOD OF MAKING THE SAME

(71) Applicant: COATS & CLARK, INC., Charlotte, NC (US)

(72) Inventors: Probir Kumar Guha, Bloomfield Hills, MI (US); Gokhan K. Coban, Altinsehir (TR)

(73) Assignee: Coats & Clark, Inc., Charlotte, NC (US)

( * ) Notice: Subject to any disclaimer, the term of this patent is extended or adjusted under 35 U.S.C. 154(b) by 0 days.

(21) Appl. No.: 16/789,580

(22) Filed: Feb. 13, 2020

(65) Prior Publication Data

US 2020/0262107 A1    Aug. 20, 2020

Related U.S. Application Data

(60) Provisional application No. 62/806,040, filed on Feb. 15, 2019.

(51) Int. Cl.
| | | |
|---|---|---|
| *B29B 11/16* | (2006.01) | |
| *B29B 11/12* | (2006.01) | |
| *B29K 101/12* | (2006.01) | |

(52) U.S. Cl.
 CPC .............. *B29B 11/16* (2013.01); *B29B 11/12* (2013.01); *B29K 2101/12* (2013.01)

(58) Field of Classification Search
 CPC ..... B29B 11/16; B29B 11/12; B29K 2101/12; B29C 51/42; B32B 3/06; B32B 7/08
 See application file for complete search history.

(56) References Cited

U.S. PATENT DOCUMENTS

| | | | |
|---|---|---|---|
| 2010/0086727 A1* | 4/2010 | Katayama | ................ D04H 3/04 |
| | | | 428/102 |
| 2018/0243946 A1* | 8/2018 | Takano | ................ B29B 15/105 |
| 2019/0039264 A1* | 2/2019 | Tsotsis | .................... B29C 43/02 |
| 2019/0308346 A1* | 10/2019 | Farris | ................... B29D 35/122 |

* cited by examiner

*Primary Examiner* — Matthew J Daniels
*Assistant Examiner* — Shibin Liang
(74) *Attorney, Agent, or Firm* — Blue Filament Law PLLC

(57) ABSTRACT

A process is provided for forming a pre-consolidated fiber preform for use in a molding process. The process includes layering a plurality of preform sheets on a pre-consolidation mold. Heating the plurality of preform sheets to a first temperature. Applying a first pressure to the plurality of preform sheets using the pre-consolidated mold. Maintaining the first temperature and the first pressure and heating for a first duration of time. A second pressure and a second temperature are then applied to the plurality of preform sheets for a second duration of time.

19 Claims, 7 Drawing Sheets

PRE-CONSOLIDATION OF THERMOPLASTIC FIBER PREFORMS AND METHOD OF MAKING THE SAME

RELATED APPLICATIONS

This application claims priority benefit of U.S. Provisional Application Ser. No. 62/806,040 filed 15 Feb. 2019; the contents of which are hereby incorporated by reference.

FIELD OF THE INVENTION

The present invention generally relates to a fiber preform for use in a composite material forming process such as resin transfer molding (RTM), liquid composite molding(LCM), compression molding, or over molding, and more particularly to pre-consolidation of a plurality of fiber preforms prior to use in the formation of a molded part.

BACKGROUND

Weight savings in the automotive, transportation, and logistics based industries has been a major focus in order to make more fuel-efficient vehicles both for ground and air transport. In order to achieve these weight savings, light weight composite materials have been introduced to take the place of metal structural and surface body components and panels. Composite materials are materials made from two or more constituent materials with significantly different physical or chemical properties, that when combined, produce a material with characteristics different from the individual components. The individual components remain separate and distinct within the finished structure. A composite material may be preferred for many reasons: common examples include materials which are stronger, lighter, or less expensive when compared to traditional materials.

Composite materials are engineered or are of naturally occurring materials made from two or more constituent materials with significantly different physical or chemical properties which remain separate and distinct at the macroscopic or microscopic scale within the finished structure. There are two categories of constituent materials: matrix and reinforcement. At least one portion of each type is required. The matrix material surrounds and supports the reinforcement materials by maintaining their relative positions. The reinforcements impart their special mechanical and physical properties to enhance the matrix properties. A synergism produces material properties unavailable from the individual constituent materials, while the wide variety of matrix and strengthening materials allows the designer of the product or structure to choose an optimum combination.

The use of fiber and particulate inclusions to strengthen a matrix is well known to the art. Well established mechanisms for the strengthening include slowing and elongating the path of crack propagation through the matrix, as well as energy distribution associated with pulling a fiber free from the surrounding matrix material. Liquid composite molding (LCM) and resin transfer molding (RTM) involve enveloping a preform structure in a thermoset resin matrix. The curable thermoset resin is used both neat and loaded with reinforcing particulate and fiber fillers. The preform can add strength to the resulting vehicle component; lower the overall density thereof through inclusion of a void volume, or a combination thereof.

Resin transfer molding or overmolding is a process in which the fiber preform is placed in a mold where a melt processible material is molded directly into the insert. Melt processible materials typically used in overmolding include elastomers and thermoplastics. The major overmolding processes includes insert molding and two-shot molding. Materials are usually chosen specifically to bond together, using the heat from the injection of the second material to form a bond that avoids the use of adhesives or assembly of the completed part, and results in a robust composite material part with a high-quality finish.

Thermoplastic prepregs have advantages over the more common thermoset composite material in terms of higher impact resistance, lower molding cycle times and the flexibility to mold small parts of different shapes. Commingled fibers are a composite fiber technology that intimately commingles or intersperses carbon reinforcement fibers with thermoplastic yarns illustratively including Nylon, Polyethylene terephthalate (PET), Polyether ether ketone (PEEK), polypropylene (PP), Polyphenylene sulfide (PPS), and ultra-high-molecular-weight polyethylene (UHMWPE), which produces a single mixed roving of uniform dispersion across its cross section. The use of commingled fibers minimizes filamentation of the reinforcement fiber and ensures parallel alignment of the fiber mix as well as a homogenous distribution resulting in an excellent consolidation. Commingled fibers may be combined to optimize a balance between strength, weight, and performance of a composite structure. Commingled fibers may be processed into fabric forms using many technologies including: unidirectional tapes, multi-axial non crimp fabric production, broad loom weaving, narrow loom weaving, hollow braiding, warp knitting, continuous pipe winding, and tailored fiber placement (TFP).

Tailored Fiber Placement (TFP) is a textile manufacturing technique in which fibrous material is arranged on another piece of base material and is fixed with an upper and lower stitching thread on the base material. The fiber material can be placed in curvilinear patterns of a multitude of shapes upon the base material. Layers of the fiber material may be built up to produce a two-dimensional fiber preform insert, which may be used as an insert overmolding or resin transfer process to create composite materials.

Recently, induction heating has been introduced in molding processes to heat molding die tools for melting thermoplastics in a molding press. Induction heating is the process of heating an electrically conducting object (usually a metal) by electromagnetic induction, through heat generated in the object by eddy currents. An induction heater consists of an electromagnet, and an electronic oscillator that passes a high-frequency alternating current (AC) through the electromagnet. The rapidly alternating magnetic field penetrates the object, generating electric eddy currents inside the conductor. The eddy currents flowing through the resistance of the material heat it by Joule heating. In ferromagnetic (and ferrimagnetic) materials like iron, heat may also be generated by magnetic hysteresis losses. The frequency of current used depends on the object size, material type, coupling (between the work coil and the object to be heated) and the penetration depth. An important feature of the induction heating process is that the heat is generated inside the object itself, instead of by an external heat source via heat conduction. Thus objects can be heated very rapidly. Water or other fluids injected through cooling channels with a fully turbulent flow rate enables efficient cooling of the molding die tools.

Induction heating has superior properties to traditional heating sources when it comes to heating molds for composite materials including total process control, no heating limitations, and quick cycle time. Flexible inductors allow the induction heating paths to follow the complex shape of tooling, while using metallic alloys from standard steel to more marginal alloys as invar for dedicated applications. Since only the surface of the mold is heated, the tooling may be rapidly cooled. Heating and cooling may both be controlled automatically with aid of thermocouples in the mold. Multiple heating zones can be accommodated. The ability to heat the mold quickly and fully control temperature distribution opens up new molding possibilities, including shorter cycles, increased part quality, and longer flow lengths. The hot mold has the ability to impart a Class A finish or replicate the finest surface textures.

A recent application of induction heating is a process called induction dual heating (IDH) that is used for molding parts combining a continuous-fiber thermoplastic composite blank and injection overmolding with additional thermoplastic compound. Such "hybrid" composites are gaining interest because they offer light weight, high strength and stiffness, and design freedom to overmold 3D details and provide surface aesthetics without secondary finishing—and all within a 60-sec cycle time.

Current hybrid composite overmolding processes generally utilize an infrared oven for preheating a consolidated thermoplastic "organosheet" and then transport the softened sheet via robot and/or conveyor to the cold mold. IDH technology uses a single induction generator for the entire process. IDH starts with robotic placement of a cold composite insert in the tool, which is already heated by the induction generator. Meanwhile, a small amount of power is sent to second, small induction heating station to heat up a sheet of solid graphite of the same size as the composite insert. The robot takes the hot graphite sheet from the induction station and places it close to the exposed "B" side of the composite insert in order to heat that second surface by radiation. The composite insert is then stamped to the desired shape, the mold opens, and the mold half with the composite insert rotates into the injection station for overmolding. The induction generator switches power from the stamping mold to the injection mold and back again.

Induction heating is more efficient than infrared and can heat to higher temperatures. Replacing the usual infrared preheating of the organosheet before placing it in the mold eliminates the difficulties of handling and precisely positioning a floppy piece of hot organosheet. It also avoids the problem of the preheated insert cooling during transfer. IDH is able to control the heating of both elements in an intelligent way, by adapting the heating time and power automatically. This system is also much more compact and thereby meets the constraints of the electronics manufacturing sector.

Despite these advancements there are still hindrances to mass production of composite material vehicle components with LCM, RTM, compression molding, or over molding including the inefficiency of preform production and the scrap produced by providing cutouts or modification of the preform prior to molding. Preforms formation by compressing chopped fibers relative to a preform mold is a comparatively slow process and the resulting perform is difficult to handle.

For example, while composite materials are increasingly used in industry because of their high strength to weight ratios there is still an unfortunate tendency for selective comingled fiber bundle positioning (SCFBP) fiber preforms to be limp in their two-dimensional form, thereby causing voids or wrinkles to be formed when the two-dimensional preform in placed in the typically three-dimensional resin transfer mold, liquid composite mold, compression mold, or over molding mold. Voids and wrinkles in transfer molded parts significantly reduce strength and modulus of the final composite material, making SCFBP fiber preform inserts unfavorable in terms of production cost, increased scrappage, and diminished throughput.

Thus, there exists a need for a novel fiber preform treatments for placement in a three-dimensional composite material forming mold.

SUMMARY OF THE INVENTION

A process is provided for forming a pre-consolidated fiber preform for use in a molding process. The process includes layering a plurality of preform sheets on a pre-consolidation mold. Heating the plurality of preform sheets to a first temperature. Applying a first pressure to the plurality of preform sheets using the pre-consolidated mold. Maintaining the first temperature and the first pressure and heating for a first duration of time. A second pressure and a second temperature are then applied to the plurality of preform sheets for a second duration of time.

BRIEF DESCRIPTION OF THE DRAWINGS

The present invention is further detailed with respect to the following drawings that are intended to show certain aspects of the present of invention, but should not be construed as a limit on the practice of the invention, wherein.

DETAILED DESCRIPTION OF THE INVENTION

Figure 1:
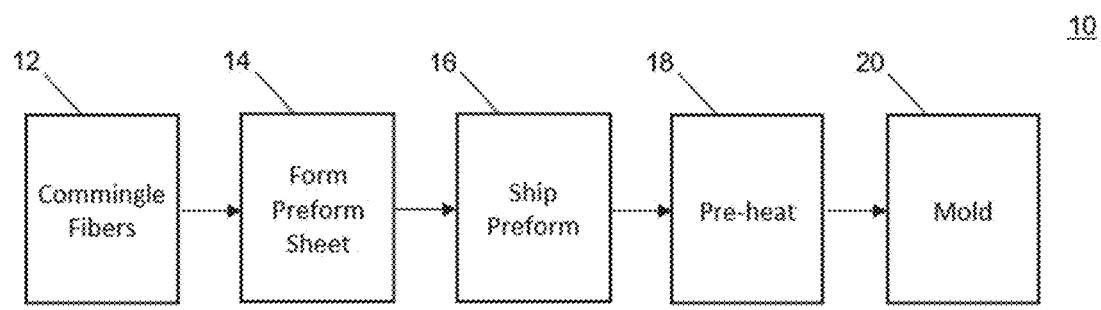
FIG. 1 is a flowchart of an existing process for forming a set of preforms for use in a mold.

The present invention has utility as a pre-consolidated fiber preform for use in a composite material forming process. It has been found that pre-heating and forming of sheets of preforms with commingled fibers may result in insufficient thermoplastic flow and fiber wet-out during the molding cycle when using these preform sheets. However, in inventive embodiments, the pre-consolidation of a plurality of fiber preforms prior to use in the formation of a molded part improves the kinetics and flow of thermoplastics and required heating during final molding of a composite part, and results in an improved molded part and faster final molding of the composite parts, thereby increasing throughput.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

It is appreciated that a fiber bundle made of comingled reinforcing fibers, such as those made of carbon, glass, or aramid fibers and thermoplastic fibers which serve to provide a matrix in a composite material made of both reinforcing and matrix fibers. The matrix fibers, being of a thermofusible nature may be formed from a thermoplastic material such as, for example, polypropylenes, polyamides, polyesters, polyether ether ketones, polybenzobisoxazoles, polyphenylene sulfide; block copolymers containing at least of one of the aforementioned constituting at least 40 percent by weight of the copolymer; and blends thereof. The thermoplastic fibers are appreciated to be recycled, virgin, or a blend thereof. The thermofusible thermoplastic matrix fibers have a first melting temperature at which point the solid thermoplastic material melts to a liquid state. The reinforcing fibers may also be of a material that is thermofusible provided their thermofusion occurs at a temperature which is higher than the first melting temperature of the matrix fibers so that, when both fibers are used to create composite, at the first melting temperature at which thermofusibility of the matrix fibers occurs, the state of the reinforcing fibers is unaffected.

As used herein, any reference to weight percent or by extension molecular weight of a polymer is based on weight average molecular weight.

As used herein, the term melting as used with respect to thermoplastic fibers or thread is intended to encompass both thermofusion of fibers such that a vestigial core structure of separate fibers is retained, as well as a complete melting of the fibers to obtain a homogenous thermoplastic matrix.

The thermoplastic fibers are appreciated to be recycled, virgin, or a blend thereof. The thermoplastic fibers in a comingled fiber bundle constitute from 20 to 80 weight percent of the comingled fibers in the present invention.

The reinforcement fibers in a comingled fiber bundles being glass fibers, polyaramid, carbon fibers, or a combination of any of the aforementioned. It is appreciated that the comingled fibers are either parallel to define a roving or include at some fibers that are helically twisted to define a yarn. It is appreciated that the physical properties of reinforcing fibers retained in a helical configuration within a fixed matrix of a completed vehicle component are different than those of a linear configuration, especially along the reinforcing fiber axis. The relative number of reinforcing fibers relative to the thermoplastic fibers is highly variable in the present invention in view of the disparate diameters of glass fibers, polyaramid fibers, and carbon fibers. Details of forming such preforms are detailed in a co-pending U.S. application Ser. No. 16/656,001 filed 17 Oct. 2019 entitled "VEHICLE COMPONENT BASED ON SELECTIVE COMINGLED FIBER BUNDLE POSITIONING FORM".

In inventive embodiments, pre-consolidation of two or more preform sheets is performed by heating the preform sheets to a temperature slightly above the melting point of the thermoplastic ingredient in each of the preform sheets and maintaining that melting temperature for 30 seconds to 25 minutes while an elevated pressure is applied to the preforms and maintained. After the above melting temperature and elevated pressure are maintained for the 30 seconds to 25 minutes the temperature applied to the sheets in reduced to a temperature below the melting temperature of the thermoplastic ingredient and the pressure applied to the sheets is reduced for a period of time. The resulting pre-consolidated sheet may then be pre-heated again for example at 200° C. to 300° C. for 1 to 10 minutes under approximately 300 psi pressure; and then molded under higher pressure of approximately 300 to 5000 psi pressure using liquid composite molding (LCM) or resin transfer molding (RTM), in the case of thermoset molding materials, or compression molding or over molding, in the case of thermoplastic molding materials, to make various products. Post-molding procedures conventional to the art then employed. In a specific embodiment the pre-consolidation of two or more preform sheets is performed using an induction heat source.

Referring now to the figures, FIG. 1 is a flowchart of an existing process 10 for forming a set of preforms for later use in a molding process to form composite parts. Commingled fibers are formed (Block 12) and are used to form preform sheets (lattices) (Block 14). The preform sheets may then be shipped (Block 16) to a part manufacturer where two or more preform sheets are placed together and preheated (Block 18) and placed in a mold (Block 20) for use in a composite material forming process to form a part.

Figure 2:
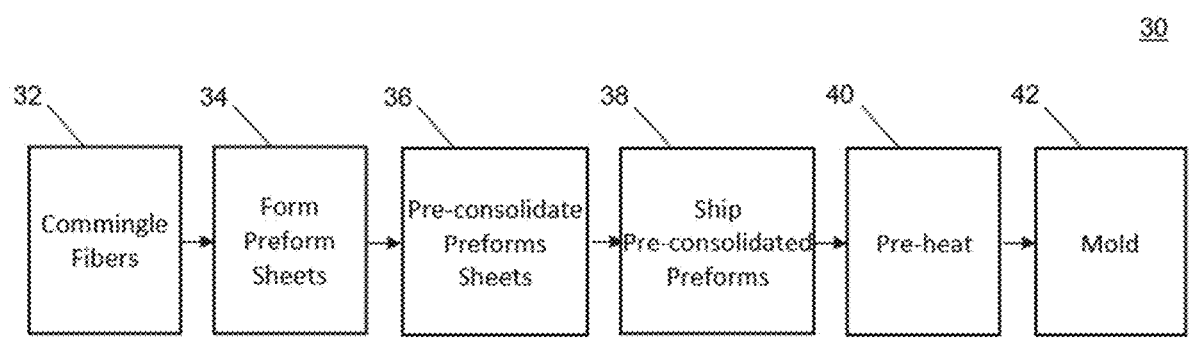
FIG. 2 is a flowchart of a process for pre-consolidating a set of preform sheets prior to using in a mold according to embodiments of the present invention.

FIG. 2 is a flowchart of an embodiment of an inventive process 30 for pre-consolidating a set of preform sheets prior to using in a mold to form a part. In process 30, commingled fibers are formed (Block 32) and are used to form preform sheets (lattices) (Block 34). Two or more preform sheets are then pre-consolidated (Block 36) by heating the preform sheets to a temperature slightly above the melting point of the thermoplastic ingredient in the preform sheets, and that above melting temperature is held for 30 seconds to 25 minutes under an elevated pressure (approximately 2 bars) to form the pre-consolidated sheet. In a specific inventive embodiment induction heating may be used to combine the preform sheets. The pre-consolidated sheet is then shipped (Block 38) to a part manufacturer where the pre-consolidated sheets is preheated (Block 40) and placed in a mold (Block 42) for use in a composite material forming process to form a part.

According to embodiments of the present disclosure, pre-consolidating the preforms in process 30 includes layering or stacking two or more preform sheets on a pre-consolidation mold, which according to embodiments, has a three-dimensional shape. The layered or stacked preform sheets are then heated to a temperature of 280° C., at which point the thermoplastic ingredient of the preform sheets, e.g. the matrix fibers of the fiber bundle of the preform and/or the stitches holding the fiber bundle of the preform in place on a substrate, begin to melt and comingle with other components of the preform, i.e. the reinforcing fibers of the fiber bundle of the preform. At the temperature of 280° C., the pre-consolidate mold applies a pressure of 300 psi to the layered or stacked preform sheets. This applied pressure encourages the melted thermoplastic of the preform sheets to interact with intersperse with the fiber bundles. The temperature of 280° C. and the applied pressure of 300 psi are maintained for approximately 2 to 10 minutes, after which the temperature and pressure applied to the pre-consolidation mold are reduced. That is, the temperature is reduced to a temperature lower than the melt temperature of the thermoplastic ingredients of the preform, and the applied pressure is reduced to a pressure less than 300 psi. Accordingly, according to embodiments of the inventive process pre-consolidated pre form sheets are pre-consolidated within a matter of minutes and then ready to be shipped to an end user, such as a vehicle component manufacturer, for use in a composite material forming process.

Figure 3:
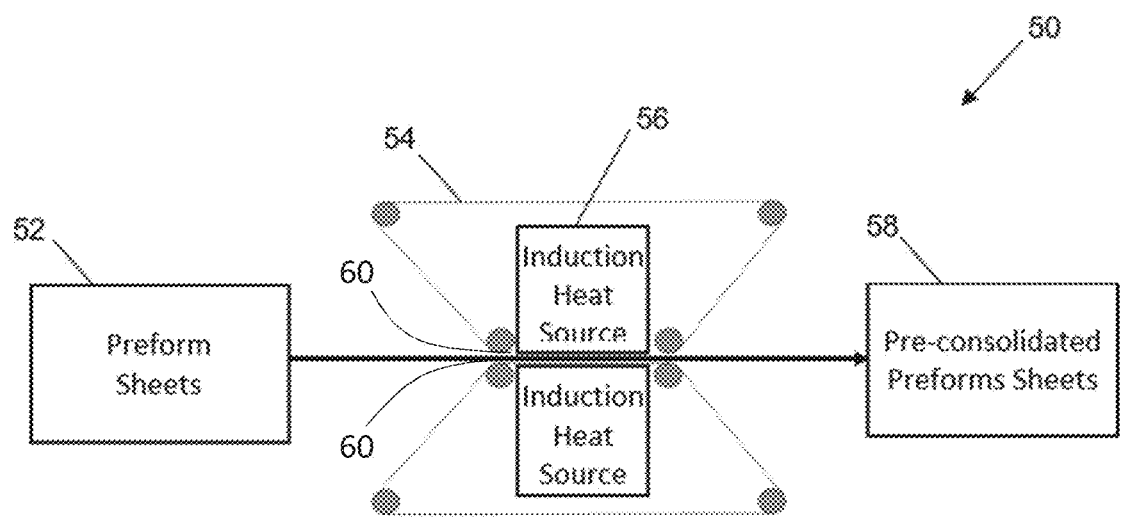
FIG. 3 is a schematic view of a production line for pre-consolidation of preform sheets in accordance with embodiments of the invention.

FIG. 3 is a schematic view of a production station 50 for pre-consolidation of preform sheets. Two or more preform sheets 52 are placed in a press 54 where induction heat sources 56 may be used to heat the preform sheets to slightly above the melting point of the thermoplastic ingredient in the preform sheets, and that melting temperature is held for 30 seconds to 25 minutes under an elevated pressure applied to the preform sheets by the press 54 to form the pre-consolidated preform sheet 58. In the schematic drawing of FIG. 3, the contacting surfaces 60 of the press 54 are shown as being planar surfaces; however, according to embodiments, the contacting surfaces 60 are non-planar such that they impart a three-dimensional shape to the resulting pre-consolidated preform sheets. According to embodiments, the three-dimensional shape imparted to the pre-consolidated preform sheet corresponds to the shape of the ultimate composite material forming mold to ensure a proper fit between the pre-consolidated preform and the mold, thereby reducing voids or wrinkles.

Embodiments of the inventive process provide for producing homogeneous or inhomogeneous pre-consolidated preform sheets. That is, preform layers made up of like fiber bundles can be placed together to form a homogeneous pre-consolidates preform sheet or preform layers made of dissimilar fiber bundles can be placed together to form an inhomogeneous pre-consolidated preform sheet. For example, if an inhomogeneous pre-consolidated preform sheet is desired to be produced, a first preform sheet comprising a fiber bundle of a first type of reinforcing fibers is placed on the pre-consolidating mold and a second preform sheet comprising a fiber bundle of a second type of reinforcing fibers is layer onto the first preform sheet. According to embodiments, an epoxy powder, such as Hexion TRAC 06720, is spread between the preform sheet layers. According to embodiments, a fiber filler, such as chopped fiber of glass, polyaramid, carbon, or a combination of any of the aforementioned, are added between the preform sheet layers.

EXAMPLES

Example 1

Figure 4A:
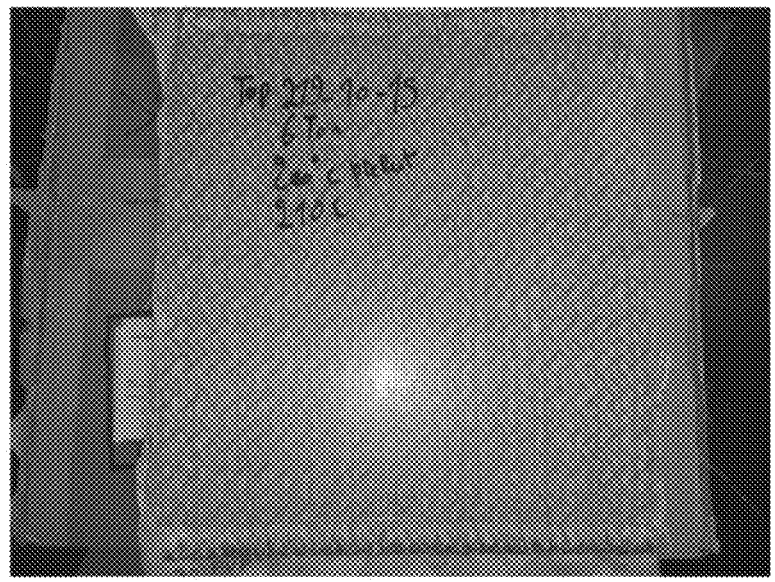
FIGS. 4A and 4B are front and back views, respectively of a consolidated fiberglass/PP preform (8×51.9% wt (30 FVF)) having four layers of unidirectional orientation that has an approximate 1.5 mm cured thickness in accordance with embodiments of the invention.
Figure 4B:
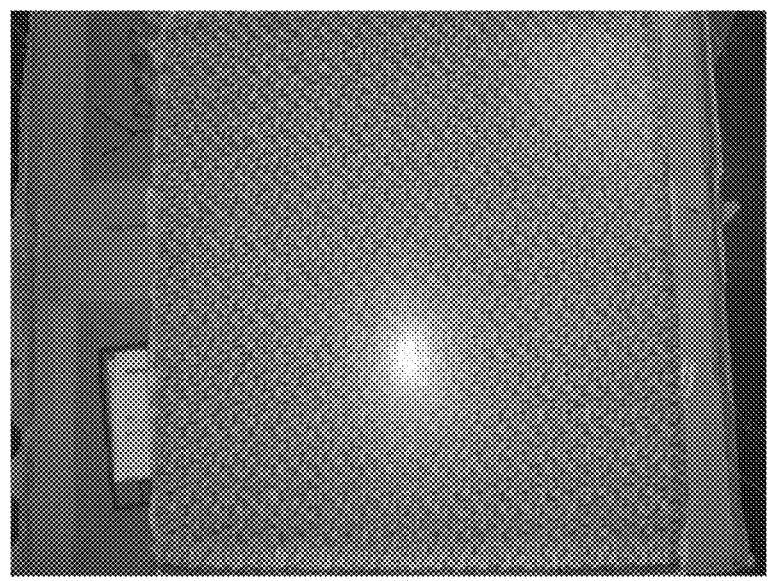
Figure 5:
FIG. 5 illustrates a consolidated fiberglass/PP preform with visible fiber waviness, as there is nothing holding the fibers straight since stitching is slowly degraded in the process and are no longer holding the fibers straight.

Preforms are pre-consolidated to make shipping and handling easier for actual molding process. The preforms are heated at a predefined temperature of 210° C. for 10 minutes and are then pressed together at 210° C. at a low tonnage for 15 minutes to create pre-consolidated preforms. FIGS. 4A and 4B are front and back views, respectively of a consolidated fiberglass/PP preform (8×51.9% wt (30 FVF)) having four layers of unidirectional orientation that has an approximate 1.5 mm cured thickness. As can be seen in FIG. 5, fiber waviness is visible, and this is expected as there is nothing holding the fibers straight since stitching is slowly degraded in the process and are no longer holding the fibers straight.

Example 2

Through experimentation, the temperature was reduced from 210 C to 190 C to improve the structural nature of the stitch during pre-consolidation of preforms. Preforms were preheated and consolidated at the same time using a heated tool to reduce cycle time Example 3

The forming of a three dimensional (3D) preform from a two dimensional (2D) pre-consolidated preform was demonstrated. Sheets (20 inches by 10 inches) of 50 k carbon fiber preforms are consolidated in [0/45/-45/-45/45/0] total orientations for an approximate 5 mm cured thickness. The preforms were wrapped in saran wrap to retain an epoxy powder (Hexion TRAC 06720) spread between the layers. Care was taken to not jostle or flip the preforms. The preforms in the experiment were as follows:

1L—1 preform 1 part, low amount of epoxy approximately 3%
1H—1 preform 1 part, high amount of epoxy approximately 6%
2L—2 preforms 1 part, low amount of epoxy approximately 3%
2H—2 preforms 1 part, high amount of epoxy approximately 6%
3L—3 preforms 1 part, low amount of epoxy approximately 3%
3H—3 preforms 1 part, high amount of approximately ~6% The epoxy used remains thermoplastic while under 100° C. (melts at 90° C.), but cures and sets above 120° C. (120° C.-170° C.)

Figure 6A:
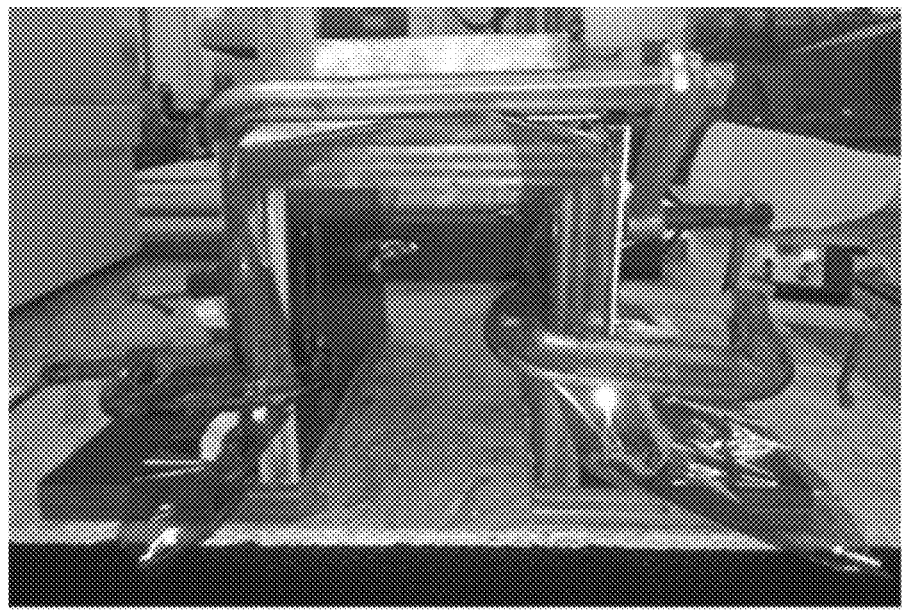
FIGS. 6A and 6B are views of a two-dimensional (2D) consolidated preforms placed on a three-dimensional (3D) shape and fixture, and pressure being applied.
Figure 6B:
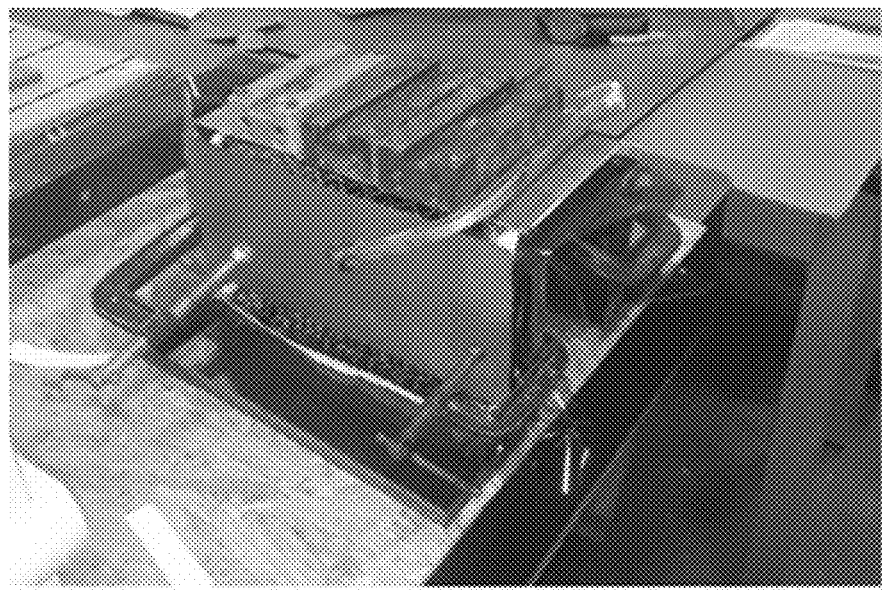

The 2D consolidated preforms were then placed on a 3D shape and fixture, and pressure was applied as shown in FIGS. 6A and 6B. Through a series of trials, an optimized set of parameters that included time and temperature was determined for a 2D preform to retain the shape of a desired 3D shape. It was determined that when the temperature of the consolidated preform itself reached above 140° C. (ambient temperature in the oven was approximately 180° C.) the epoxy powder was activated so that the preform retained the 3D shape.

Figure 7A:
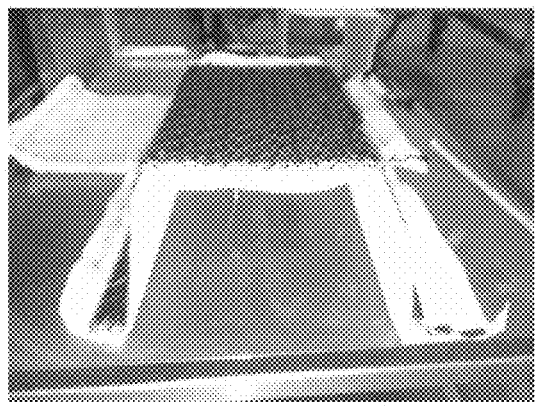
FIGS. 7A and 7B show a consolidated preform 1L that was formed into a 3D shape on a straight walled die with ninety degree bends at an oven temperature of 180° C. for 60 minutes in accordance with embodiments of the invention.
Figure 7B:
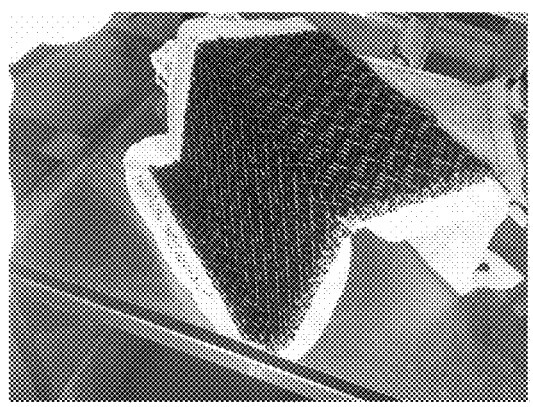
Figure 8A:
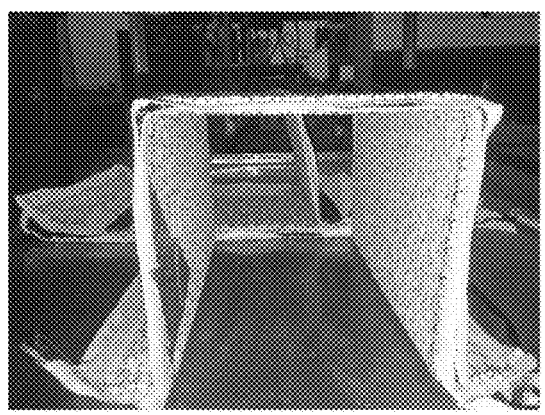
FIGS. 8A and 8B show a consolidated preform 3L that was formed into a 3D shape on an inward tapered walled die at an oven temperature of 180° C. for 120 minutes in accordance with embodiments of the invention.
Figure 8B:
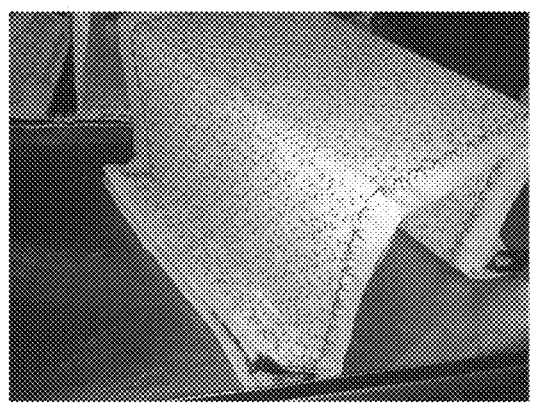
Figure 9A:
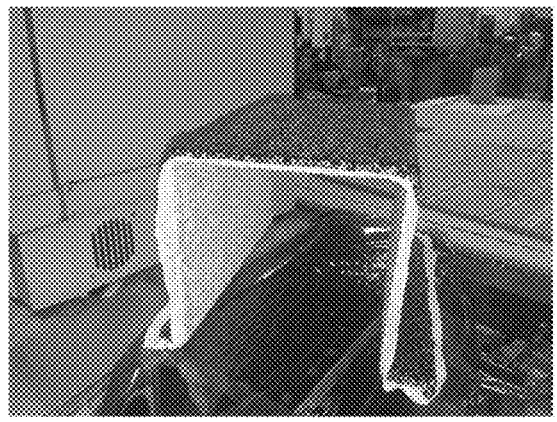
FIGS. 9A and 9B show a consolidated preform 1H that was formed into a 3D shape on the inward tapered walled die at an at an oven temperature of 180° C. for 90 minutes in accordance with embodiments of the invention.
Figure 9B:
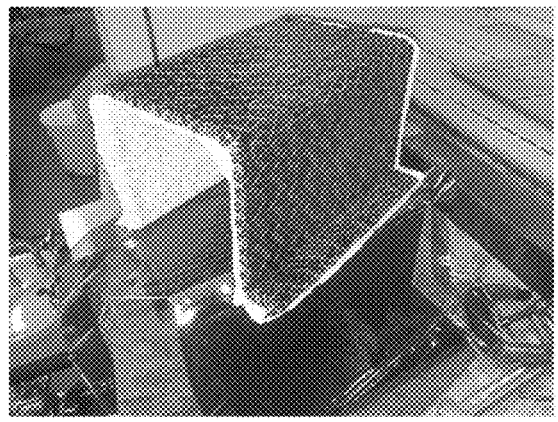
Figure 10A:
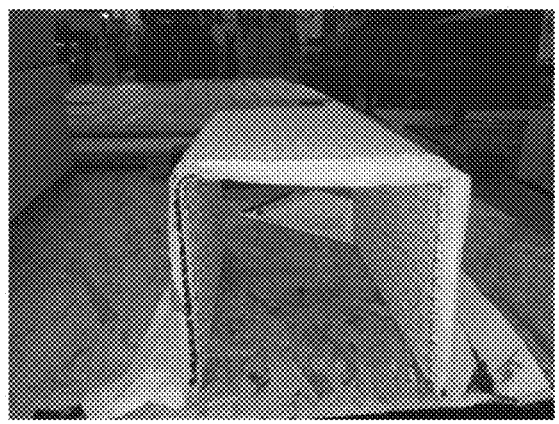
FIGS. 10A and 10B show a consolidated preform 3L that was formed into a 3D shape on an inward tapered walled die at an oven temperature of 180° C. for 120 minutes in accordance with embodiments of the invention.
Figure 10B:
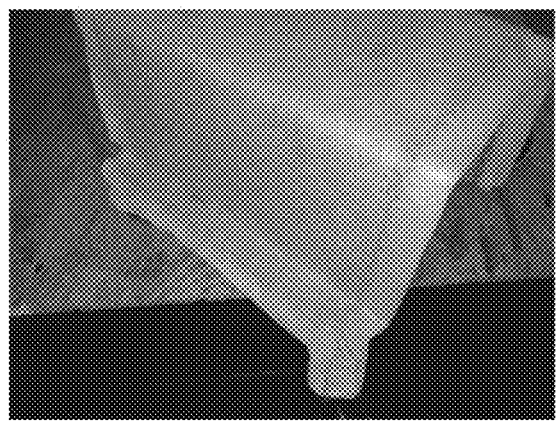

FIGS. 7A and 7B show the consolidated preform 1L that was formed into a 3D shape on a straight walled die with ninety degree bends at an oven temperature of 180° C. for 60 minutes. While the piece held its shape the finished part opened up slightly. As can best be seen in FIG. 6A the die has vertical walls with a negative angle of approximately ten degrees that compensates for the tendency of the formed 3D preform to open up. Preforms 3L and 1H were formed on the die with the negative angled sidewalls as shown in FIGS. 6A and 6B. FIGS. 8A and 8B and FIGS. 10A and 10B show the consolidated preform 3L that was formed into a 3D shape on the inward tapered walled die at an oven temperature of 180° C. for 120 minutes. FIGS. 9A and 9B show the consolidated preform 1H that was formed into a 3D shape on the inward tapered walled die at an at an oven temperature of 180° C. for 90 minutes.

Example 4

The thermoplastic or curable epoxy particles that are heated/reacted to stiffen the part into its 3D preform shape are added by putting the preforms into a coating bath and drawing fibers through the bath. To coat the fibers a sizing process is used, where individual glass filaments are drawn out, coated and combined into a single fiber. Sizing protects fibers against abrasion and breakage, and gives them product-specific characteristics, including stiffness, cutting properties and in the case of chopped strands, flow properties.

Glass fiber sizing is not a single chemical compound, but a mixture of several complex chemistries, each of which contributes to the sizing's overall performance. The primary components are the film former and the coupling agent. Depending on its formulation, the film former, so called because it forms a film on the glass strands, serves a number of functions. The film former is designed to protect and lubricate the fiber and hold fibers together prior to molding, yet also to promote their separation when in contact with resin, ensuring wetout of all the filaments. Film formers, with some exceptions, are chemically similar to the matrix resin for which the sizing is designed.

The coupling agent, typically an alkoxysilane compound, serves primarily to bond the fiber to the matrix resin. Silanes offer just what is needed to bond two highly dissimilar materials—the glass fiber, which is hydrophilic (bonds easily to water), bonds to a resin that is hydrophobic (insoluble in water and does not bond well to it). Silanes have a silicon end that bonds well to glass, and an opposing organic end that bonds well to resins.

Beyond these two major components (film former and the coupling agent), sizings also may include additional lubricating agents, as well as antistatic agents that keep static electricity from building up on the nonconductive fibers as they are formed and converted at high speed.

The foregoing description is illustrative of particular embodiments of the invention, but is not meant to be a limitation upon the practice thereof. The following claims, including all equivalents thereof, are intended to define the scope of the invention.

The invention claimed is:

1. A process of forming a pre-consolidated fiber preform for use in a molding process, the process comprising:
   layering a plurality of preform sheets on a pre-consolidation mold, each of the plurality of preform sheets formed of at least one comingled continuous fiber bundle arranged in a curvilinear pattern and held in place on a substrate with stitching, the comingled continuous fiber bundle containing both reinforcing fibers and matrix fibers;
   heating the plurality of preform sheets to a first temperature;
   applying a first pressure to the plurality of preform sheets using the pre-consolidated mold;
   maintaining the first temperature and the first pressure and heating for a first duration of time; and
   applying a second pressure and a second temperature to the plurality of preform sheets for a second duration of time.

2. The process of claim 1 further comprising forming the plurality of preform sheets.

3. The process of claim 1 wherein the plurality of preform sheets comprise reinforcing fibers and matrix fibers.

4. The process of claim 1 wherein the second temperature is lower than the first temperature.

5. The process of claim 1 wherein the first temperature is a temperature above a melting point of a thermoplastic ingredient in the plurality of preform sheets.

6. The process of claim 1 wherein the second temperature is a temperature below a melting point of a thermoplastic ingredient in the plurality of preform sheets.

7. The process of claim 1 wherein induction heaters provide heat to heat the plurality of preform sheets to the first temperature and the second temperature.

8. The process of claim 1 wherein the first pressure is greater than the second pressure.

9. The process of claim 1 wherein the first pressure is 300 psi.

10. The process of claim 1 wherein the first duration is 30 seconds to 25 minutes.

11. The process of claim 1 wherein the first duration is 2 minutes.

12. The process of claim 1 wherein the second duration is 30 seconds to 25 minutes.

13. The process of claim 1 wherein the second duration is 2 minutes.

14. The process of claim 1 wherein the pre-consolidation mold has a three-dimensional shape.

15. The process of claim 1 wherein the pre-consolidated fiber preform retains a shape of the pre-consolidation mold.

16. The process of claim 1 further comprising applying an epoxy powder between the layers of the plurality of preform sheets.

17. The process of claim 1 further comprising applying a plurality of chopped fibers between the layers of the plurality of preform sheets.

18. The process of claim 1 wherein the molding process is any of liquid composite molding (LCM), resin transfer molding (RTM), over molding, or compression molding.

19. The process of claim 1 further comprising preheating the pre-consolidated fiber preform and placing the pre-consolidated fiber preform into a mold for forming a molded part.

* * * * *